United States Patent Office 3,128,190
Patented Apr. 7, 1964

3,128,190
METHOD OF MAKING COMBINED
FRUIT YOGHURT
John K. Donay, Fresno, Calif., and Victor G. Tahan,
P.O. Box 98, Caruthers, Calif.; said Donay assignor to
said Tahan
No Drawing. Filed Sept. 11, 1961, Ser. No. 137,033
8 Claims. (Cl. 99—59)

The present invention relates to a fruit flavored fermented milk product and more particularly to a fruit-yoghurt composition and method of making the same. The instant application constitutes a continuation-in-part of our application Serial No. 83,913, filed January 23, 1961, which is being abandoned in favor of this application.

The fermented milk product known as yoghurt is recognized as possessing high food value while being of relatively low caloric content. It is also known for its therapeutic properties, particularly those useful in the alleviation of intestinal disorders. However, the flavor of yoghurt is such that for many people a taste therefor must be acquired. As a result, the market for yoghurt is somewhat restricted and its therapeutic properties not as widely enjoyed as its value justifies.

The modification or masking of yoghurt flavor has long been a goal of the dairy food industry. For example, fruit essences, flavorings, and/or juices have been mixed with yoghurt both during and after preparation. Generally speaking, such efforts have not been fully successful because of fermentation or deterioration of the added materials.

The Mishima process of Patent No. 2,824,804 has endeavored to take advantage of such fermentation by the provision of a double fermentation process directed to a marked modification of both the yoghurt and fruit additive flavors in an effort to attain a more pleasant flavor. The present invention is contrasted with the Mishima process in that it involves a single fermentation step and preserves the fruit additives with a minimum of flavor modification thereof.

Prior to the present invention, no products were known to the applicants which satisfactorily blended whole fruit with yoghurt in a stable composition. The obvious manner of making such a composition, namely, the simple mixing of chopped solid fruit with prepared yoghurt, does not yield the desired results. This has been tried by applicants and others without success. The fruit does not succeed in satisfactorily masking the flavor of the yoghurt when so incorporated. In fact, at room temperatures, the bacteria in the yoghurt ferments the fruit and causes it to sour. At room temperatures, this frequently occurs in the brief period of one-half hour. Accordingly, restaurants are unable to serve fruit-yoghurt dessert by such simple mixing. Commercial establishments cannot afford the risks of handling such a product. Further, to require customers personally to mix the fruit with the yoghurt is inconvenient and impractical. For these reasons, it has previously been impractical to market a composite yoghurt fruit product having a recognizable fruit flavor through the usual retail outlets.

Accordingly, it is an object of the present invention to provide a stable composition of yoghurt and solid fruit and a method of making the same.

Another object is successfully to mix yoghurt and fruit into a unified composition wherein the characteristic taste and odor of yoghurt is minimized or obviated but the food values thereof are retained.

Another object is to provide a combined semi-solid, yoghurt-fruit product wherein the fruit is not fermented and soured by bacteria in the yoghurt even at room or higher temperatures and which will remain in a stable condition at least for the usual life of the yoghurt.

A composite object is to add fruit to yoghurt while making the latter and to minimize or avoid fermentation of the sugars contained or accompanying the fruit.

Another object is to encourage the consumption of yoghurt by rendering such yoghurt more palatable.

Another object is to provide a product of the type described which is useful not only as a health food but also as an epicuric specialty, for example, as a dessert.

These, together with other objects will become more fully apparent upon reference to the following description.

Prior to a specific description of the subject composition and method of making the same, it is observed that the method broadly includes:

(1) Heating milk to a predetermined upper temperature.

(2) Cooling the milk to a predetermined lower temperature.

(3) Adding a sweetening agent which is non-fermentable by the yoghurt culture employed and mixing the same thoroughly into the milk at said lower temperature.

(4) Adding and blending a yoghurt culture into the sweetened milk while maintaining said lower temperature.

(5) Pouring the blend of milk and sweetening agent and culture over solid fruit pre-cooked in a sweetening agent which is non-fermentable by said culture or otherwise mixing the same.

(6) Incubating said blend and the fruit to ferment the lactose or milk sugar at said lower temperature for predetermined time or until a sufficiently thick composition is produced.

(7) Cooling said thickened composition whereupon it is ready for human consumption.

Considering in greater detail the subject method in the order of the steps outlined above, fresh skimmed or whole milk is heated, preferably in a heavy container or double boiler to prevent scorching, to an upper boiling temperature of at least about 205° F. It is to be understood that this as well as the other temperatures set forth herein are not critical in the sense that a few degrees more or less than stated have deleterious effect. In order to present an example of the specific proportions of ingredients determined to be suitable in carrying out the steps of the subject invention, it is assumed that at least one quart of milk is boiled and partially evaporated in this manner until the milk is concentrated so that it contains about twenty percent solids.

One quart of this concentrated milk is cooled to a lower temperature of about 100° F., preferably by refrigeration. When the lower temperature has been reached, about one-half ounce of sweetening agent in the form of sucrose, is added to the quart of milk. The sweetening agent is thoroughly mixed with the milk.

Next, yoghurt culture is added to the sweetened and cooled milk. It is essential that the culture be *Lactobacillus bulgaricus* and that other Lactobacilli normally employed as yoghurt starters be avoided. For example, it has been discovered that conventional yoghurts commercially available in the United States are not suitable for the purpose and that Arabic yoghurts, utilizing *Lactobacillus bulgaricus* are excellently suited to the purpose. For example, the various sugar fermenting yeasts and the *caucasicus, lactis, helveticus, acidophilus, bifidus, delbrueckii, casei, leichmannii, plantarum, pastoriamnus, buchneri, brevis,* and *fermenti* Lactobacilli are not satisfactory in that they have a malefic effect on the fruit and fruit sugars. *Lactobacillus bulgaricus* is the only starter known to the applicants which is suitable for employment in the subject invention and avoids fermenting the sucrose and other fruit constituents. Such starter is stored under refrigeration so that the bacteria is dormant until needed. When it is added to the sweetened milk, the temperature is sufficient to initiate bacterial activity. Approximately 8 oz. of the *Lactobacillus bulgaricus* is mixed into a quart of the sweetened milk and stirred or otherwise mixed until blended while maintaining the temperature at approximately 98° F.

Fruit, such as apples, peaches, nectarines, pineapples, or the like, is prepared for incorporation into the material. The fruit is preferably reduced to convenient particle size by pealing, slicing, chopping, comminuting or the like and precooked in sucrose. The sucrose precooking provides a syrup coating for the fruit particles and replaces a portion of the fermentable fruit sugars with sucrose. The fruit is then mixed with the blend of milk, sweetening agent and *Lactobacillus bulgaricus*. This is conveniently accomplished by pouring the blend over the fruit and syrup. Approximately two-thirds of the blend and one-third of the fruit, by volume, provides an excellent proportion. During this mixing step, the temperature is preferably maintained at approximately 98° F.

The next step in the process is to incubate the mixture at a temperature of from about 95° F. to about 100° F. for approximately two hours or until the composition has assumed a semi-solid, thickened form. During this incubation period, the *Lactobacillus bulgaricus* ferments the lactose in the milk to produce lactic acid. This sucrose present in the composition is not fermented. Thus, the sweet flavors are preserved and no souring occurs. However, it is preferred to limit the incubation period to about two hours in order to minimize the chances of inadvertent souring of the fruit.

In order positively to stop fermentation, the final step in the subject method is to cool the semi-solid composition to a temperature of about 34° F. or less. Usually, a period of about one-half hour is adequate to make the necessary temperature reduction under normally available refrigeration. It is to be noted, however, that fermentation stops below about 50° to about 60° F.

The resulting composition is a combined yoghurt fruit product having several distinctive characteristics. The product has a semi-solid consistency similar to ice cream but somewhat less solid at the preferred serving temperature of about 30° to 40° F. The predominant flavor, as evidenced by taste and odor, is the flavor of the fruit employed. The flavor of the conventional yoghurt is effectively masked or modified so that the product is appealing and does not require a learned or acquired taste. Not only does the sucrose replace a portion of the natural fermentable sugars of the fruit but it also provides a protective shield about each food particle. Actually, since the sucrose is not fermented in the process, its sweetening effect in the composition is stronger than, and more than offsets, the sour flavor of the lactic acid in the composition. Therefore, the resulting product is highly palatable and has an excellent flavor. It not only possesses the known therapeutic values of yoghurt but makes a popular dessert because of its appealing flavor.

Furthermore, the fruit and yoghurt remain in a stable, substantially homogeneous condition for the usual life of yoghurt even at normal room temperatures. Of course, as with regular yoghurt, the subject product is preferably maintained under refrigeration for extended preservation.

Although the invention is described in terms of particular ingredients and in what is conceived to be the most practical and preferred method, it is recognized that departures may be made therefrom within the scope of the invention, which is not to be limited to the details disclosed herein but is to be accorded the full scope of the claims so as to embrace any and all equivalent ingredients and methods.

Having described our invention, what we claim as new and desire to secure by Letters Patent is:

1. A method of making a substantially stable food product comprising cooking fruit particles in a sucrose solution whereby natural sugars of the fruit are partially replaced by sucrose and the particles covered with sucrose, mixing the fruit particles with milk which has been condensed to approximately 20% solid content and to which sucrose has been added, fermenting the milk with the fruit particles mixed therewith by the action of *Lactobacillus bulgaricus*, said fruit particles and milk being mixed at a ratio of about 1:2, and cooling the resulting mixture at least below about 60° F. to terminate fermentation.

2. A method of making a substantially stable food product of fruit and yoghurt comprising adding *Lactobacillus bulgaricus* as a yoghurt culture to milk having a temperature of approximately 98° F. and containing sucrose; combining the milk and culture at said temperature with whole fruit at a ratio of about 2:1 and in the presence of a sucrose which is non-fermentable by the yoghurt culture; incubating the milk, the culture, the fruit, and the sucrose at said temperature to cause fermentation of the milk by the culture for a period sufficient to form a thickened composition; and cooling the thickened composition below the fermentation temperature to between about 30° F. to 40° F.

3. A method of making a combined fruit-yoghurt product comprising the steps of heating milk to above about 205° F. to condense the same to approximately 20% solid content; cooling the condensed milk to a predetermined lower temperature of about 100° F.; dissolving sucrose in the milk mixing *Lactobacillus bulgaricus* as a yoghurt culture with the milk while maintaining about said lower temperature; mixing the milk and culture with fruit at a ratio of approximately 2:1 the fruit having natural fermentable sugars thereby replaced by sucrose which is non-fermentable by the yoghurt culture; maintaining the milk, culture, and fruit at about said lower temperature to allow fermentation of the milk by the culture and until a thickened composition forms; and cooling said thickened composition below about 60° F. to stop fermentation thereof.

4. A method of making a combined fruit-yoghurt product comprising the steps of heating milk to about 205° F. to evaporate water therefrom until the milk contains approximately 20% solids; cooling the evaporated milk to approximately 90° F.; adding sucrose to the milk while it is maintained at about said lower temperature; mixing a yoghurt culture which does not ferment said sucrose with the sweetened milk while maintaining about said lower temperature; combining the sweetened milk and culture with fruit at a ratio of about 2:1, the fruit having natural fermentable sugars thereof replaced by sucrose; maintaining the milk, culture and fruit at about said lower temperature to allow fermentation of the milk by the culture and until a thickened composition forms; and cooling said thickened composition below about 60° F. to stop fermentation thereof.

5. The method of claim 1 wherein said milk is heated to a temperature of about 205° F. to effect said evaporation, wherein said lower temperature is about 100° F., and wherein said composition is cooled to a temperature below about 34° F. to stop fermentation.

6. The method of claim 1 wherein said fermentation is continued for a period of about two hours.

7. A method of making a food product comprising condensing milk to an approximately 20% solid content, adding sucrose to the milk, cooking fruit particles in a sucrose solution whereby natural fermentable sugars of the fruit are replaced by sucrose and the particles substantially covered with sucrose, mixing said fruit products with the milk at a ratio of about 1:2, fermenting the milk with the fruit particles mixed therein by a culture consisting substantially exclusively of *Lactobacillus bulgaricus* characterized by an inability to ferment sucrose and cooling the resultant fermented mixture below the fermentation temperature to a range of about 30° F. to 40° F.

8. A method of making a yoghurt fruit product comprising cooking particles of fruit having natural fermentable sugars in a sucrose solution whereby fermentable sugars of the fruit are replaced with sucrose and the particles substantially covered with sucrose, condensing milk to at least about 20% solid content by weight, mixing the fruit particles treated with sucrose with the milk at a ratio of about 1:2, fermenting the milk with the fruit particles mixed therein with *Lactobacillus bulgaricus* strains which are characterized by an inability to ferment sucrose, and cooling the resultant fermented mixture below the fermentation temperature to a range of about 30° F. to 40° F.

References Cited in the file of this patent
UNITED STATES PATENTS 2,824,804     Mishima _____ Feb. 24, 1958

FOREIGN PATENTS 517,086     Great Britain _____ Jan. 19, 1940

OTHER REFERENCES

Bergey's Manual of Determinative Bacteriology, Williams and Wilkins Co., Baltimore, Md., 1957, page 547.